United States Patent [19]

Nishi et al.

[11] Patent Number: 4,544,608
[45] Date of Patent: Oct. 1, 1985

[54] METHOD OF MANUFACTURING AQUEOUS FORTIFIED ROSIN DISPERSION

[75] Inventors: Yasutaka Nishi, Takasago; Masao Hamada, Kakogawa; Yoshihide Ishikawa, Kakogawa; Setsuo Inoue, Kakogawa, all of Japan

[73] Assignee: Harima Chemicals, Inc., Kakogawa, Japan

[21] Appl. No.: 619,893

[22] Filed: Jun. 12, 1984

Related U.S. Application Data

[63] Continuation-in-part of Ser. No. 436,646, Oct. 25, 1982, abandoned.

[51] Int. Cl.$^4$ .................. B32B 9/06; C08L 93/04
[52] U.S. Cl. ............................. 428/498; 106/238
[58] Field of Search ............... 106/238; 260/97; 252/354; 428/498

[56] References Cited

U.S. PATENT DOCUMENTS

| | | | |
|---|---|---|---|
| 3,565,755 | 2/1971 | Davison | 162/168.1 |
| 4,148,665 | 4/1979 | Kulick et al. | 106/236 |
| 4,203,776 | 5/1980 | Greiner | 106/238 |
| 4,309,338 | 1/1982 | Okumichi et al. | 260/97 |

FOREIGN PATENT DOCUMENTS 065365 5/1974 Australia .

*Primary Examiner*—Theodore Morris
*Attorney, Agent, or Firm*—Sandler & Greenblum

[57] ABSTRACT

A method of manufacturing an aqueous O/W dispersion of fortified rosin for use in the sizing of paper by mixing the same with water and a dispersing agent by first forming a dispersion of the W/O type in the presence of the dispersing agent and then turning the first dispersion to an O/W type by sequential addition of water thereto, wherein said dispersing agent has the general formula:

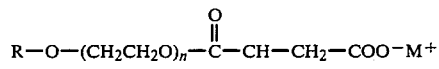

in which R is a straight- or branched-chain alkyl group having 4 to 24 C atoms, n is an integer of 6 to 20, and $M^+$ is a cation selected from the group consisting of $Na^+$, $K^+$, and $NH_4^+$.

13 Claims, No Drawings

METHOD OF MANUFACTURING AQUEOUS FORTIFIED ROSIN DISPERSION

CROSS-REFERENCE TO RELATED APPLICATION

The present application is a continuation in part of application Ser. No. 436,646, filed Oct. 25, 1982, now abandoned, the disclosure of which is hereby incorporated by reference hereto.

BACKGROUND OF THE INVENTION

1. Field of the Invention

The present invention relates to a method of manufacturing an aqueous dispersion of fortified rosin for use in paper sizing, and more particularly to a method of manufacturing the same by the phase inversion process from W/O or water-in-oil type dispersion to O/W or oil-in-water type in the presence of an effective dispersing agent thus far not used in paper sizing.

2. Description of Material Information

Aqueous dispersions of rosin and its derivatives have been widely used in paper sizing and are commonly known as rosin sizes. The sizing process involves the separate addition of a dilute aqueous dispersion of rosin size and alum to a pulp slurry. Fortified rosins are made by adducting an $\alpha,\beta$ unsaturated carboxylic acid to ordinary rosin, and essentially, mixtures comprised of unreacted rosin and adducted rosin, and are much more effective for sizing. Typical acids used are fumaric acid, acrylic acid, maleic acid, itaconic acid, citraconic acid, and the anhydrides of the latter three, although fumaric acid and maleic anhydride are by far the more common acids used. In general, if rosin is treated with formaldehyde, or with modified formaldehyde, the resultant addition product increases the efficiency of rosin sizes.

U.S. Pat. No. 3,565,755 discloses a solvent emulsifying method giving an emulsion. The process includes solving the fortified rosin in a water-insoluble, volatile organic solvent, such as benzene or toluene, mixing the solution with an aqueous solution of alkaline material, or a water-soluble salt of rosin and/or fortified rosin, homogenizing the unstable mixture to produce a stable emulsion, and removing the organic solvent by distillation. A disadvantage of this process is that the intermediate fortified rosin solution in the organic solvent is thermally unstable and tends to aggregate at higher temperatures.

Australian Patent Application No. 69365, filed on May 24, 1974, discloses a method of manufacturing aqueous rosin dispersion by homogenizing a molten rosinous substance at a temperature of about 150° to about 195° C. under a pressure of about 140 kg/cm² to about 560 kg/cm², in the presence of an anionic dispersing agent, including saponified rosin base material, sodium alkylbenzene sulfonate, sodium naphthalene sulfonic acid, sodium lauryl sulfate, and the ammonium salt of the sulfate ester of an alkylphenoxy (polyethyleneoxy)ethanol.

U.S. Pat. No. 4,148,665 Kulick et al. discloses that colloidal aqueous dispersions of rosin possess improved mechanical and heat stability when they contain small amount of a dissolved water-dispersible emulsifying agent selected from the group consisting of tetrasodium N-(1,2-dicarboxyethyl)-N-octadecylsulfosuccinate, disodium N-octadecylsulfosuccinate, disodium dodecylpenta(ethoxy)ethylsulfosuccinate, and disodium decylsulfosuccinate as stabilizing agent. Such dispersions are prepared by the use of organic solvent such, as toluene, and by passing the material in solution through a homogenizer and removing the solvent. In this invention the phase inversion process was not used. The formula of this invention called for 5 ethoxy groups to be present.

U.S. Pat. No. 4,203,776, to Greiner discloses a process for preparing paper size from fortified rosin by the use of the phase inversion process, using as dispersing agents salts of sulfosuccinic acid-ethylene oxide condensates having the following general formula, in which R is a normal or branched chain alkyl group containing from 4 through 18 carbon atoms, and n is an integer of 4 through 25:

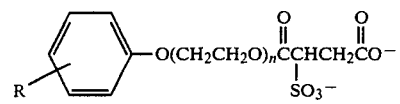

As can be seen from the formula, the presence of a benzene ring is required for these dispersing agents.

Finally, U.S. Pat. No. 4,309,338, to Okumichi et al. discloses a process for preparing an aqueous dispersion of a rosin-base material by the phase inversion process, employing at least one of the following dispersants:

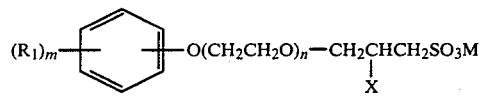

wherein $R_1$ is a hydrocarbon residue having 4 to 18 carbon atoms, m is an integer of 1 or 2, n is an integer of 4 to 25, X is a hydrogen atom or a hydroxyl group, and M is a monovalent cation, and

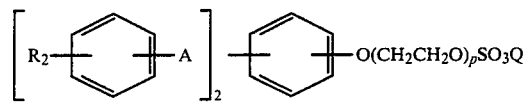

wherein $R_2$ is a hydrogen atom or a lower alkyl group, A is a straight- or branched-chain alkylene having 2 to 3 carbon atoms, p is an integer of 4 to 25, and Q is a monovalent cation. Again, the presence of a benzene ring in the dispersants is required. The inventors pointed out that the excellent sizing effects, high mechanical and dilution stabilities, and improved foaming properties are achievable only when at least one dispersing agent fitting at least one of the above two formulae is used.

SUMMARY OF THE INVENTION

The object of the present invention is to provide a method of manufacturing a stabilized fortified rosin dispersion with excellent sizing efficiency via the phase inversion dispersion process, using a new type of dispersing agent which does not contain a benzene ring.

According to the present invention, the performance of dispersions manufactured by the phase inversion processes thus far proposed, can be improved by the use of a new type dispersing agent having the formula:

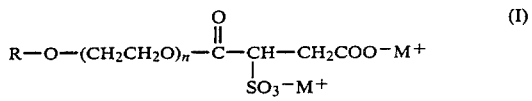

wherein R is a straight- or branched-chain alkyl group having 4 to 24 carbon atoms, n is an integer of 6 to 20 inclusive, and $M^+$ is a cation selected from the group consisting of $Na^+$, $K^+$, and $NH_4^+$. Compounds having the formula (I) have not previously been used as dispersing agents, nor has their suitability for such use been appreciated.

The advantage of the present invention is that an aqueous dispersion containing a small amount of the dispersing agent is quite stable for storage and mechanical shear action experienced in transfer pumps and lines. Moreover, such dispersions have excellent suitability for use in paper sizing.

DETAILED DESCRIPTION OF THE INVENTION

The rosin used to prepare the fortified rosin can be any of the commercially available types of rosin, such as wood rosin, gum rosin, tall oil rosin, and mixtures thereof in their crude or refined state.

The method of manufacturing the aqueous fortified rosin dispersion of the present invention is, in general, as follows:

Fortified rosin as described above under "Description of the Prior Art" is allowed to melt in advance. To this is added with good agitation, an aqueous solution of the dispersing agent having the formula (I):

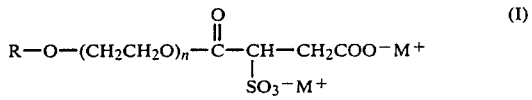

A dispersion of W/O type is made by this operation. Subsequent slow sequential addition of warm water under agitation at a temperature of 70° to 100° C. causes phase inversion from W/O type to O/W type, to yield an aqueous dispersion of the fortified rosin of the present invention.

A dispersing agent having the general formula (I) can be made by the reaction of higher alcohols with ethylene oxide in the presence of water, followed by monoesterification with sulfosuccinic acid and neturalization with aqueous alkali.

The number of ethylene oxide groups n in the formula (I) is an integer of 6 to 20, in which 8 to 16 is more preferable, and 9 to 12 is most preferable. If n exceeds 20, the dispersing agent is less effective.

As shown below in example 7, when n=5 in formula (I) of the present invention, the dispersing agent is less effective, even though the phase inversion process is substituted for the water-insoluble solvent method.

One outstanding characteristic of general formula (I) of the present invention is that it contains no benzene ring. This may be the reason for the effectiveness of the dispersing agents of the present invention, although this point is not known for certain at this time.

The amount of the dispersing agent to be used according to the present invention is in general about 2 to 4% by wt. to molten rosin. Increased use is not economical.

Particular hydrocarbons and the like, including paraffin wax, microcrystalline wax, oxidized wax, petroleum resin and turpentine resin, can be added as fillers or extenders to the fortified rosin, in amounts ranging up to about 30%, without much loss of performance.

The following examples 1 through 6 and examples for comparison 7 through 16 serve to illustrate preferred methods of manufacturing the aqueous fortified rosin dispersion of the invention, and to demonstrate the superior results obtainable through the use of sizing containing the dispersing agent of the invention. However, the Examples are not intended to restrict the spirit and the scope of the present invention.

EXAMPLE 1

Eight parts (weight basis, the same hereinafter) of fumaric acid were dissolved in 92 parts of molten formaldehyde-modified tall oil rosin, and maintained at 200° C. for 3 hours for adduct formation. (The product, regardless of the composition, is hereinafter referred to as fortified rosin.)

The fortified rosin was allowed to melt completely at 180° C., then cooled to 130° C., and mixed slowly over 5 mintues with 22 parts of 13.7% aqueous solution of the dispersing agent (i.e., 3 parts of the dispersing agent in water), wherein the dispersing agent has the formula (I), where R is a mixture of α methyl alkyl groups, and n is 7. Before mixing the solution of dispersing agent is heated to about 90° C. The temperature at the end of mixing is 95° C. Slow sequential addition of about 44 parts of warm water at 95° C., results in a white, creamy, finely dispersed emulsion of W/O type containing about 60% solids, which is readily convertible to O/W type, by mixing it quickly with 128 parts of warm water with violent agitation for one minute. The O/W emulsion is then quenched to 30° C. The aqueous dispersion obtained has a solids content of 35% and is colored pale blue, and has excellent stability for storage.

EXAMPLES 2 THROUGH 4

The procedure of Example 1 was subtantially repeated except that the numeral n in the formula (I) of the dispersing agent is:
in Example 2, 9.5 on average.
in Example 3, 12 on average.
in Example 4, 16 on average.

EXAMPLE 5

The procedure of Example 1 was substantially repeated, except 90 parts of the fortified rosin and 10 parts of paraffin were used instead of 100 parts of the fortified rosin, and the numeral n in the formula (I) was 9.5. The aqueous dispersion obtained contained 35% solids and was colored pale blue.

EXAMPLE 6

The procedure of Example 1 was substantially repeated, except the fortified rosin was prepared as follows:

Six parts of fumaric acid were dissolved in 94 parts of molten formaldehyde-modified tall oil rosin, and maintained at 200° C. for 3 hours for adduct formation.

The following examples are shown for comparison, in order to show the superiority of the dispersing agents of the present invention.

EXAMPLE 7

The procedure of Example 1 was substantially repeated, except the numeral n in the formula (I) is 5, or less than the minimum value of 6. This dispersing agent thus has the same number of ethoxy groups as emulsifier C, used in U.S. Pat. No. 4,148,665, discussed above.

EXAMPLES 8 THROUGH 14

The procedure of Example 1 was substantially repeated, except for not using the dispersing agent of the formula (I), and instead, using:
in Example 8, 3 parts of

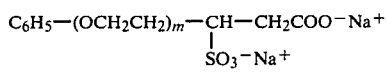

(m is 9.5 on average)

the resulting aqueous dispersion obtained containing 33% solids and being white in color,
in Example 9, 3 parts of

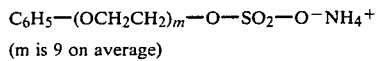

(m is 9 on average)

the resulting aqueous dispersion obtained containing 32% solids and being white in color;
in Example 10, 4.5 parts of

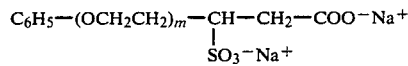

(m is 9.5 on average)

the resulting aqueous dispersion obtained containing 35% solids and being pale blue in color;
in Example 11, 3 parts of

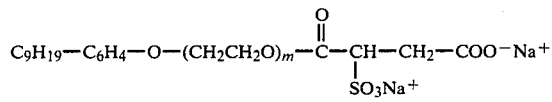

(m is 9.5 on average)

(which would conform to the general formula listed in U.S. Pat. No. 4,203,776, discussed above) the resulting aqueous dispersion obtained containing 35% solids and being white in color;
in Example 12, 5 parts of

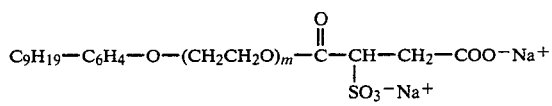

(m is 9.5 on average)

(which is again the same compound as listed in Example 11) the resulting aqueous dispersion obtained having a solids content of 35% and a pale blue color;
in Example 13, 3 parts of

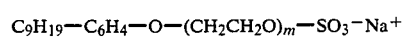

(m is 12 on average)

(which is a member of the class of compounds proposed in U.S. Pat. No. 4,309,338) the aqueous dispersion obtained having a solids content of 35% and a white color;
in Example 14,

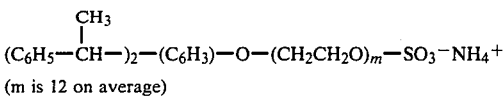

(m is 12 on average)

(which is again a member of the class of compounds proposed in U.S. Pat. No. 4,309,338 (Example 20)) the aqueous dispersion obtained having a solids content of 35% and a white appearance.

EXAMPLES 15 AND 16

The procedure of Example 1 was substantially repeated, except that the fortified rosin of Example 7 was prepared by dissolving 6 parts of fumaric acid in 94 parts of molten formaldehyde-modified tall oil rosin, and using, instead of the dispersing agent of the formula (I):
in Example 15, 3 parts of

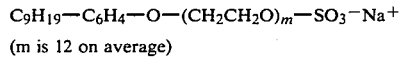

(m is 12 on average)

the aqueous dispersion obtained containing 35% solids and being pale blue in color;
in Example 16, 3 parts of

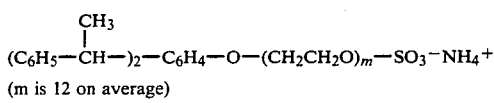

(m is 12 on average)

the aqueous dispersion obtained containing 35% solids and having a pale blue appearance.

The aqueous dispersions obtained in Examples 1 through 6, and Examples for comparison 7 through 16 have the properties shown in Table 1.

As can be seen from Table I, the aqueous fortified rosin dispersions of the present invention (Examples 1 through 6) are much smaller in mean particle size and more stable against hard water and in storage than a preparation in accordance with the general formula of U.S. Pat. No. 4,203,776 (Examples 11 and 12) and the preparations in accordance with the general formula of U.S. Pat. No. 4,309,338 (Examples 13 through 16).

The aqueous fortified rosin dispersions of Examples 1 through 16 were further examined by the Stoeckigt sizing test (Japanese Industrial Standard JIS P 8122).

The slurry sample is prepared as follows: To the beaten pulp (L/N BKP, L/N=1/1, Freeness 430 ml, c.s.f.) is added 0.3% or 0.5% of the aqueous dispersion depending upon the experiment, and 1.5% of alum so as to prepare a uniform stock. The percentages are based on the weight of the dry pulp. The stock is made into a sheet of 65 g/m² at a temperature of 30° C. In other respects, the ordinary method is followed.

The results of measurements on each sample paper prepared are as shown in Table 2.

TABLE 1

Properties of aqueous fortified rosin dispersions

| Example No. | Numeral n or m | Amount used (%) (1) | Mean diameter based on number of particles ($10^{-3}$ mm) | Stability against hard water (2) | Stability for storage (25° C.) (3) (%) |
|---|---|---|---|---|---|
| 1 | 7 | 3.0 | 0.7 | None | 0.2 |
| 2 | 9.5 | 3.0 | 0.4 | None | L.T. (4) 0.1 |
| 3 | 12 | 3.0 | 0.3 | None | L.T.0.1 |
| 4 | 16 | 3.0 | 0.3 | None | L.T.0.1 |
| 5 | 9.5 | 3.0 | 0.2 | None | L.T.0.1 |
| 6 | 9.5 | 3.0 | 0.2 | None | L.T.0.1 |
| 7 | 5 | 3.0 | 1.5 | Small amount | 1.0 |
| 8 | 9.5 | 3.0 | 1.0 | Small amount | 0.6 |
| 9 | 9.5 | 3.0 | 1.0 | None | 0.5 |
| 10 | 9.5 | 4.5 | 0.3 | None | 0.2 |
| 11 | 9.5 | 3.0 | 1.0 | Small amount | 0.6 |
| 12 | 9.5 | 5.0 | 0.3 | None | 0.2 |
| 13 | 12 | 3.0 | 1.4 | Small amount | 6.7 |
| 14 | 12 | 3.0 | 1.7 | Small amount | 9.8 |
| 15 | 12 | 3.0 | 0.6 | None | 0.4 |
| 16 | 12 | 3.0 | 0.9 | None | 0.6 |

Remarks:
(1) Based on the fortified rosin.
(2) Based on the observation of aggregate flocs in the dispersion after 48 hrs. maintained at 25° C., which has a fortified rosin content of 5%, and is made by dilution of said fortified rosin dispersion with hard water of 11.2 DH.
(3) Based on resin precipitate after 2 months.
(4) L.T. stands for "less than".

TABLE 2

Results of the sizing tests

| Example No. | Fortified rosin fumaric acid content (%) | Added amount of the aqueous dispersion based upon the wt. of the dry pulp (%) | |
|---|---|---|---|
| | | 0.3 | 0.5 |
| 1 | 8.0 | 15.0 | 24.1 |
| 2 | 8.0 | 15.6 | 24.5 |
| 3 | 8.0 | 15.2 | 24.1 |
| 4 | 8.0 | 13.9 | 23.1 |
| 5 | 8.0 | 13.5 | 23.3 |
| 6 | 6.0 | 10.9 | 21.2 |
| 7 | 8.0 | 10.6 | 20.8 |
| 8 | 8.0 | 10.2 | 20.3 |
| 9 | 8.0 | 10.6 | 20.7 |
| 10 | 8.0 | 9.0 | 18.7 |
| 11 | 8.0 | 11.7 | 20.8 |
| 12 | 8.0 | 8.6 | 19.0 |
| 13 | 8.0 | 10.3 | 20.1 |
| 14 | 8.0 | 10.1 | 19.4 |
| 15 | 6.0 | 7.4 | 18.6 |
| 16 | 6.0 | 7.2 | 18.0 |

What is claimed is:

1. A method of manufacturing an aqueous O/W dispersion of a fortified rosin by mixing said fortified rosin with water and a dispersing agent, comprising:
   (a) first forming a dispersion of the w/o type in the presence of said dispersing agent; and
   (b) converting said W/O dispersion to said O/W dispersion by sequential addition of water thereto, wherein said dispersing agent has the general formula:

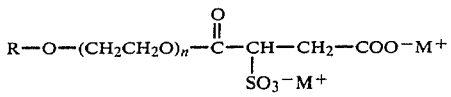

in which R is an straight- or branched-chain alkyl group having 4 to 24 C atoms, n is an integer of 6 to 20, and $M^+$ is a cation selected from the group consisting of $Na^+$, $K^+$, and $NH_4^+$.

2. The method as defined by claim 1 wherein n is an integer of from 8-16.

3. The method of claim 1 hwerein n is an integer of from 9-12.

4. Paper products treated by said aqueous O/W dispersion of a fortified rosin produced by the method of claim 1.

5. Paper sizing agents made by the proces of claim 1.

6. The method as defined by claim 1, wherein said dispersing agent is made by reacting higher alcohols with ethylene oxide in the presence of water, followed by monoesterifying with sulfosuccinic acid and neutralizing with aqueous alkali.

7. The method as defined by claim 6, wherein n is an integer from 8-16.

8. The method as defined by claim 6, wherein n is an integer from 9-12.

9. Paper products treated by said aqueous O/W dispersion of a fortified rosin produced by the method of claim 6.

10. A method of manufacturing sized paper products comprising the step of treating paper with an aqueous O/W dispersion of a fortified rosin, said rosin having been prepared by mixing said rosin with water and a dispersing agent, comprsing:
    (a) first forming a dispersion of W/O type in the presence of said dispersing agent, and
    (b) converting said W/O dispersion to said O/W dispersion by sequential addition of water thereto, wherein said dispersing agent has the general formula:

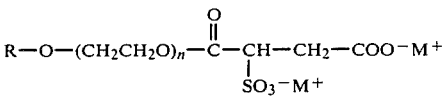

in which R is a straight- or branched-chain alkyl group having 4 to 24 C atoms, n is an integer of six to twenty, and $M^+$ is a cation selected from the group consisting of $Na^+$, $K^+$, and $NH_4^+$.

11. The method of claim 10, wherein n is an integer from 8-16.

12. The method of claim 10, wherein n in an integer from 9-12.

13. The method of claim 10, wherein said dispersing agent is made by reacting higher alcohols with ethylene oxide in the presence of water, followed by monesterifying with sulfosuccinic acid and neutralization with aqueous alkali.

* * * * *